United States Patent
Lambert et al.

(10) Patent No.: US 11,420,180 B2
(45) Date of Patent: Aug. 23, 2022

(54) REACTOR ARRANGEMENT AND METHOD FOR PRE-HYDROLYSIS OF BIOMASS MATERIAL

(71) Applicant: VALMET AB, Sundsvall (SE)

(72) Inventors: Francois Lambert, Sundsvall (SE); Johan Carlsson, Alnö (SE); Rolf Boman, Sundsvall (SE); Patrik Pettersson, Alnö (SE)

(73) Assignee: VALMET AB, Sundsvall (SE)

( * ) Notice: Subject to any disclaimer, the term of this patent is extended or adjusted under 35 U.S.C. 154(b) by 197 days.

(21) Appl. No.: 16/759,503

(22) PCT Filed: Oct. 30, 2018

(86) PCT No.: PCT/SE2018/051110
§ 371 (c)(1),
(2) Date: Apr. 27, 2020

(87) PCT Pub. No.: WO2019/088906
PCT Pub. Date: May 9, 2019

(65) Prior Publication Data
US 2020/0306719 A1      Oct. 1, 2020

(30) Foreign Application Priority Data
Oct. 31, 2017   (SE) .................................. 1751351-6

(51) Int. Cl.
*B01J 19/26*          (2006.01)
*B01J 19/20*          (2006.01)
(Continued)

(52) U.S. Cl.
CPC ............... *B01J 19/26* (2013.01); *B01J 4/002* (2013.01); *B01J 19/20* (2013.01); *C13K 1/02* (2013.01)

(58) Field of Classification Search
CPC ... B01J 19/26; B01J 4/002; B01J 19/20; B01J 2219/182; B01J 2219/1943; C13K 1/02;
(Continued)

(56) References Cited

U.S. PATENT DOCUMENTS 1,106,736 A    8/1914    Schuler
4,592,804 A    6/1986    Noreus et al.

FOREIGN PATENT DOCUMENTS

AT       336992 B       6/1977
CN    106868909 A       6/2017
(Continued)

OTHER PUBLICATIONS

Extended European Search Report, Application No. 18873855.3, dated Jul. 15, 2021, 5 pages.

*Primary Examiner* — Huy Tram Nguyen
(74) *Attorney, Agent, or Firm* — Foley & Lardner LLP

(57) ABSTRACT

A reactor arrangement for pre-hydrolysis of biomass material. The reactor arrangement comprises a reactor vessel arranged substantially horizontally, wherein the vessel comprises an inlet for receiving the biomass material arranged at an upper portion of the vessel. The inlet may be arranged at a first longitudinal end of the vessel. The vessel may furthermore comprise an outlet at a second longitudinal end of the vessel. The reactor arrangement further comprises a set of steam injection orifices arranged to inject or supply steam into the reactor vessel. The set of steam injection orifices comprises at least two orifices arranged below the inlet at a distance from each other. The at least two orifices may be arranged at a distance from each other in the lateral direction of the reactor vessel. Furthermore, a method for pre-hydrolysis treatment of biomass in a substantially horizontal reactor vessel is provided.

15 Claims, 3 Drawing Sheets

(51) Int. Cl.
  *B01J 4/00* (2006.01)
  *C13K 1/02* (2006.01)
(58) Field of Classification Search
  CPC .. Y02E 50/10; D21C 1/02; D21C 1/04; D21C 7/00; C12P 7/10; C12P 19/02
  USPC .......................................................... 127/1
  See application file for complete search history.

(56) References Cited

FOREIGN PATENT DOCUMENTS

| | | |
|---|---|---|
| EP | 2500466 A1 | 9/2012 |
| SU | 421725 A | 3/1974 |
| WO | WO 2010/009548 A1 | 1/2010 |
| WO | WO 2013/041298 A1 | 3/2013 |
| WO | WO-2014/047097 A1 | 3/2014 |
| WO | WO-2016/094594 A1 | 6/2016 |
| WO | WO-2017/136915 A1 | 8/2017 |

REACTOR ARRANGEMENT AND METHOD FOR PRE-HYDROLYSIS OF BIOMASS MATERIAL

TECHNICAL FIELD

The invention relates to a reactor arrangement for pre-hydrolysis of biomass material and to a method for pre-hydrolysis of biomass in such a reactor arrangement.

BACKGROUND

Arrangements for pre-treatment or pre-hydrolysis of cellulosic biomass is known in the art. Such arrangements may comprise one or more pressurized reactors in which the biomass is pretreated with steam at elevated pressure and temperature with or without the addition of chemicals.

Temperature and time are two important parameters in the kinetics of such a pre-hydrolysis treatment. In particular, it is preferable that the desired temperature is reached as fast as possible in order to get the right kinetics and to avoid building an excessively large reactor. It is furthermore important that heating of the biomass is as homogenous as possible, since a heterogeneous heating may lead to unreacted, low-reacted or even over-reacted material, which in turn may cause yield loss, formation of undesired by-products and/or problems in the downstream process.

A reactor arrangement for pre-hydrolysis of biomass material may comprise a charger (T-pipe), a reactor (which may be horizontal) and a discharger. The biomass material may be fed into the charger for example by means of a plug screw feeder, and may fall through the charger into the reactor. Steam is usually injected at one or more positions directly into the reactor and/or into the charger. EP2500466B1 discloses that steam is preferably injected near the feedstock inlet of the reactor, and that steam may also be injected upstream of the inlet of the reactor to enhance the mixing of steam and feedstock before the mixture enters the reactor.

SUMMARY

An object of the invention is to achieve further improved mixing of the steam and biomass to allow a more homogenous temperature and/or a more rapid temperature increase in the reactor.

These and other objects are achieved by the present invention by means of a reactor arrangement and a method according to the independent claims.

According to a first aspect of the invention, there is provided a reactor arrangement for pre-hydrolysis of biomass material. The reactor arrangement comprises a reactor vessel arranged substantially horizontally, wherein the vessel comprises an inlet for receiving the biomass material arranged at an upper portion of the vessel. The reactor vessel is adapted for pre-hydrolysis treatment of the biomass material at elevated pressure and temperature. The treatment may be performed at a pressure of 5-30 bars (preferably 8-20 bars), and at a temperature of 159-235° C. (preferably 175-215° C.) for a duration of 2-45 minutes (preferably 5-30 minutes). The inlet may be arranged at a first longitudinal end of the vessel. The vessel may furthermore comprise an outlet at a second longitudinal end of the vessel. The reactor arrangement further comprises a set of steam injection orifices arranged to inject or supply steam into the reactor vessel. The set of steam injection orifices comprises at least two orifices arranged at a distance from each other. At least one, at least two, or all of the at least two orifices are arranged below or directly below the inlet. The at least two orifices may be arranged at a distance from each other in the lateral direction of the reactor vessel.

In other words, the reactor vessel is provided with a set of steam injection orifices, i.e. a set of two or more injection orifices or nozzles arranged to inject or supply steam into the reactor vessel, for example by being provided in through holes in the reactor vessel wall. At least one, two or all of the steam injection orifices or nozzles of the set are provided below the inlet, i.e. at longitudinal positions of the reactor vessel which lie within the longitudinal interval defined by the longitudinal extension of the inlet. At least two of the orifices or nozzles are arranged at a lateral, longitudinal and/or vertical distance from each other in order to inject steam from two or more directions, thereby improving mixing of the biomass and the steam.

The reactor vessel may be described as elongated and/or may have a substantially circular cross section, i.e. is substantially cylindrical. In embodiments, the vessel has a diameter of at least 1 m or at least 2 m.

The invention is based on the insight that further improved mixing of steam and biomass may be achieved by arranging at least one, or at least two or all of the orifices below or directly below the inlet of the reactor vessel at a distance from each other. This allows the steam to successively mix with the biomass falling through the inlet in an effective manner, thereby facilitating rapid temperature increase and even temperature distribution. The invention is furthermore based on the insight that known steam injection configurations may provide inadequate mixing of the steam and biomass in the case of reactor vessels having relatively large cross sections, for example a reactor vessel having a diameter of 1 m or more. For such larger reactor vessels, the inventors have realized that the steam injection orifices should advantageously be arranged below or directly below the inlet and be distributed in the lateral or circumferential direction of the reactor vessel, i.e. at a distance from each other in the lateral or circumferential direction.

In an advantageous embodiment, at least two steam injection orifices of the set of steam injection orifices are arranged below the inlet and at a distance from each other in the longitudinal direction of the vessel. Advantageously, the set of steam injection orifices comprises at least three injection orifices arranged below the inlet and being distributed in both the longitudinal and lateral/circumferential directions of the reactor vessel. This configuration may provide an even further improved mixing.

In embodiments, the set of steam injection orifices comprises at least three orifices distributed in a plane crossing said reactor vessel along part of the circumference of the vessel. In other words, the at least three orifices are distributed along a circular or ellipsoid line extending (partly) around the envelope surface of the reactor vessel. Put differently, the at least three orifices are arranged in a circular or ellipsoid array around the parts of the reactor vessel which is not occupied by the inlet. The plane may be perpendicular to the longitudinal direction of the vessel. Advantageously, the plane may form an acute angle with the longitudinal direction of the vessel, i.e. such that the array of orifices is inclined. The angle of the plane is preferably such that the horizontal projection of the plane corresponds to the cross-section of the inlet, such that all biomass falling down through the inlet is subject to steam from the orifices distributed in the plane.

In embodiments, at least two of the steam injection orifices have different diameters. Preferably, at least one steam injection orifice arranged at a lower vertical position than at least one other steam injection orifice has a greater diameter than the other orifice. For example, the lowermost orifice(s) may have a greater diameter than adjacent orifices. This may provide advantageous mixing properties since the biomass (due to gravity) tends to concentrate at the bottom of the reactor vessel.

In embodiments, the arrangement further comprises at least one additional set of steam injection orifices arranged downstream of the set of orifices, the additional set of orifices comprising at least two steam injection orifices. The at least one additional set of steam injection orifices may be arranged less than 2 m downstream of the inlet, and preferably less than 1 m downstream of the inlet. The additional set of orifices may comprise orifices arranged in the same manner as in the (first) set of steam injection orifices in the embodiments described above. In particular, the orifices of the additional set may be distributed in the lateral and/or longitudinal direction, and may be distributed in a (vertical or inclining) plane crossing said reactor vessel along the circumference of the vessel. Furthermore, the orifices may have different diameters, as described in the embodiment above. The additional set(s) of steam injection orifices may provide the advantage that further steam is added to the biomass before it is further compacted and its permeability decreases.

According to a second aspect of the invention there is provided a method for pre-hydrolysis of biomass in an elongated substantially horizontal reactor vessel, wherein the vessel comprises an inlet for receiving said biomass material arranged at a first longitudinal end of the vessel at an upper portion thereof, and an outlet at a second longitudinal end of the vessel. The method comprises supplying biomass to the vessel via the inlet, adding or injecting steam into the reactor vessel below or directly the inlet at two or more positions being at a distance from each other, and discharging the treated biomass via said outlet. The two or more positions may be spaced apart in the lateral or circumferential direction of the reactor vessel. The treatment may be performed at a pressure of 5-30 bars (preferably 8-20 bars), and at a temperature of 159-235° C. (preferably 175-215° C.) for a duration of 2-45 minutes (preferably 5-30 minutes). The same advantages and insights described above with respect to the first aspect of the invention also applies to the second aspect of the invention.

In embodiments of the method according to the second aspect of the invention, the step of adding or injecting steam comprises injecting steam below or directly below the inlet at two or more positions at a distance from each other in the longitudinal direction of the vessel, or injecting steam below the inlet at three or more positions distributed in both the longitudinal and lateral/circumferential directions of the reactor vessel. This may provide an even further improved mixing.

In embodiments of the method according to the second aspect of the invention, the step of adding or injecting steam comprises injecting steam at three or more positions distributed in a plane crossing said reactor vessel along part of the circumference of the vessel.

In embodiments of the method according to the second aspect of the invention, the step of adding or injecting steam comprises injecting steam with different speed and/or flow rate at different positions by using steam injection orifices with different diameters. For example, the steam may be injected at a higher flow rate at the bottom of the reactor vessel than at higher positions.

In embodiments of the method according to the second aspect of the invention, the method further comprises adding or injecting steam downstream of the inlet, for example less than 1 m or less than 2 m downstream of the inlet. The steam may be injected at positions distributed in the lateral and/or longitudinal direction, or at positions distributed in a (vertical or inclining) plane crossing the reactor vessel along the circumference of the vessel. Furthermore, the steam may be injected with different speed and/or flow rate at different positions, as described in the embodiment above.

The features of the embodiments described above are combinable in any practically realizable way to form embodiments having combinations of these features. Further, all features and advantages of embodiments described in connection with the arrangement according to the first aspect of the invention may be applied in corresponding embodiments of the method according to the second aspect of the invention.

BRIEF DESCRIPTION OF THE DRAWINGS

These and other aspects of the present invention will now be described in more detail with reference to the appended drawings, which show presently preferred embodiments of the invention, wherein.

DETAILED DESCRIPTION

Figure 1:
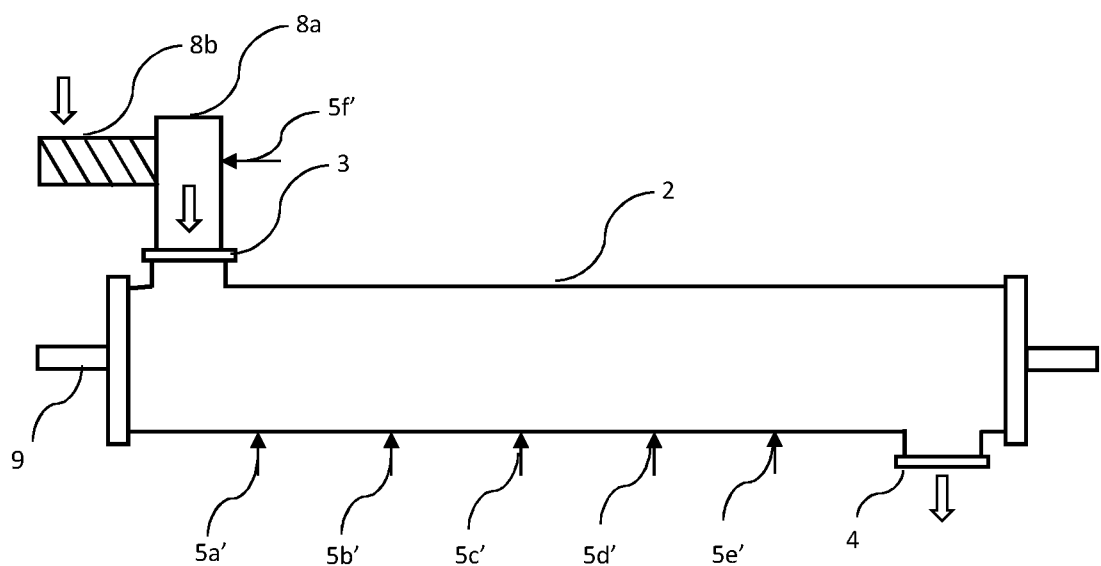
FIG. 1 is a schematic illustration of a prior art reactor arrangement.

FIG. 1 is a schematic side view illustration of a prior art reactor arrangement for pre-hydrolysis treatment of biomass material. The reactor arrangement comprises an elongated reactor vessel 2 arranged horizontally, which vessel has a circular cross section, i.e. has a cylindrical shape. FIG. 1, being a 2D view, only shows the front side of the vessel. The vessel comprises an inlet 3 for receiving the biomass material arranged at an uppermost portion of the vessel. The inlet is arranged at a first longitudinal end of the vessel (to the left in the figure). The vessel furthermore comprises an outlet 4 at a second (opposite) longitudinal end of the vessel at the lowermost portion of the vessel. A charging device comprising a vertically arranged pipe 8a is connected to the inlet 3, and a plug screw feeder 8b is connected to an upper portion of the pipe 8a for feeding pressurized biomass material thereto. A conveying screw 9 is arranged inside the reactor vessel to convey the material from the inlet towards the outlet (only the protruding axle portions are visible in the figure. The reactor arrangement further comprises a set of steam injection orifices 5a'-5f (schematically illustrated as arrows) arranged to supply steam to the biomass. The set of steam injection orifices comprises a plurality of orifices 5a'-5e' mounted in through holes in the bottom of the reactor vessel along a straight line along the extension thereof. The set of steam injection orifices further comprises an orifice 5f' arranged to inject steam into the pipe 8a of the charger.

Figure 2:
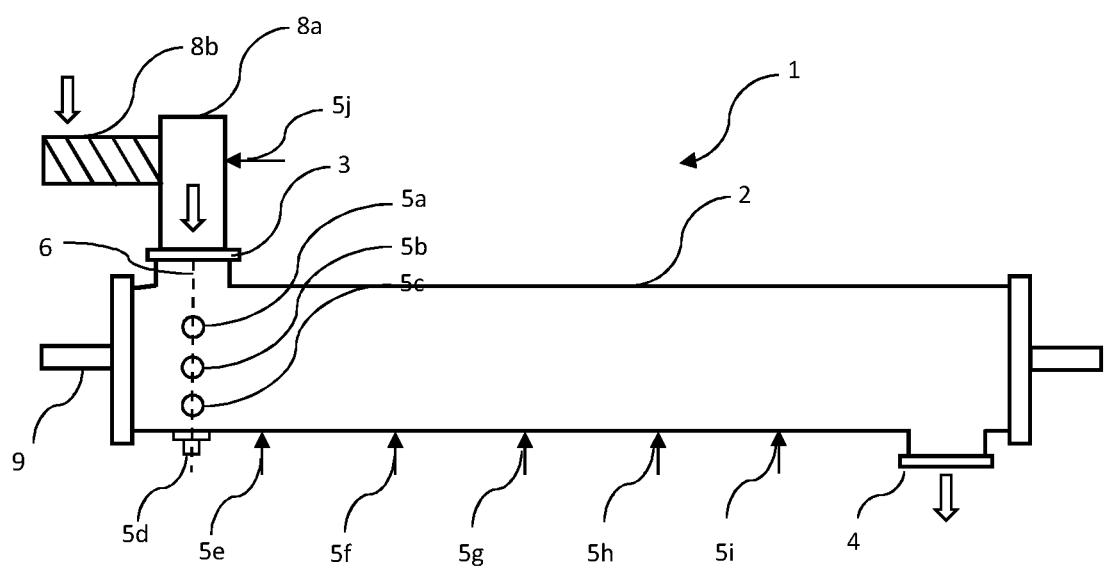
FIG. 2 is a schematic illustration of an embodiment of a reactor arrangement according to the first aspect of the invention.

FIG. 2 is a schematic side view illustration of an embodiment of a reactor arrangement 1 according to the first aspect of the invention. The reactor arrangement differs from the prior art arrangement in FIG. 1 in that it further comprises a set of steam injection orifices arranged directly below the inlet 3 and at a distance from each other in the lateral direction. Since the reactor vessel is cylindrical, this also implies that the orifices are arranged at distance from each other in the circumferential direction. In this embodiment, the set of steam injection orifices comprises seven orifices distributed in a vertical plane 6 crossing the reactor vessel at a longitudinal position corresponding to the center of the inlet 3. In the figure, only four of the orifices 5a-d are visible. It is understood however that the rear side of the vessel is provided with three additional orifices at corresponding positions as the orifices 5a-c. The orifices are distributed at even spacing in the circumferential direction along the circular line formed by the crossing of the plane 6 and the reactor vessel wall. In this embodiment, the vessel has a diameter of about 1.2 m. The lowermost orifice 5d has a larger diameter, i.e. a larger effective flow area, to allow a greater flow of steam from the bottom of the vessel. In other embodiments, all orifices have the same diameter. The uppermost orifices (5a and the corresponding orifice on the rear side) are preferably arranged at a vertical height of the reactor which corresponds to, or is slightly above or below, the material level under normal operating conditions. A typical filling level profile is illustrated in FIG. 3b.

Figure 3A:
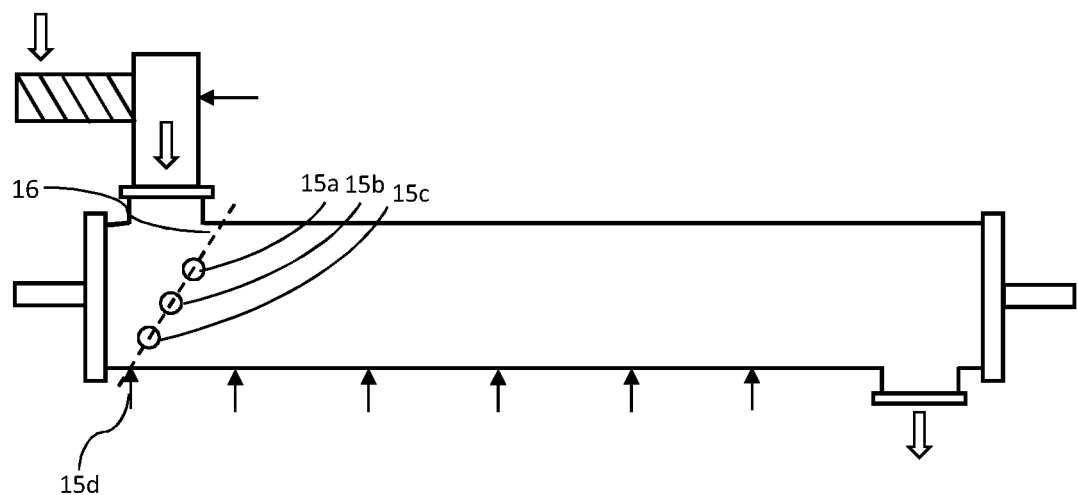
FIG. 3a is a schematic illustration of another embodiment of a reactor arrangement according to the first aspect of the invention.
Figure 3B:
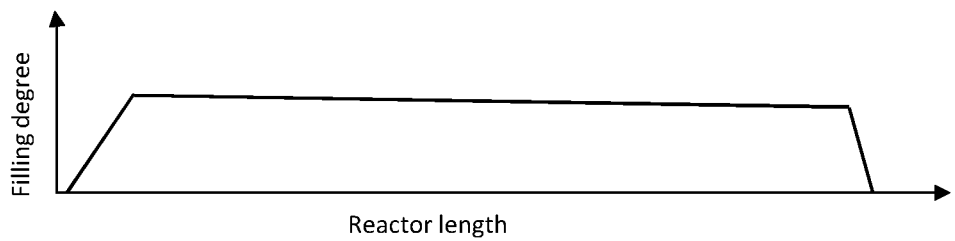
FIG. 3b is a schematic illustration of the filling degree of the reactor arrangement in FIG. 3a as a function of its length.

FIG. 3a is a schematic side view illustration of another embodiment of a reactor arrangement according to the first aspect of the invention. The reactor arrangement differs from the embodiment in FIG. 2 in that the set of steam injection orifices 5a-d distributed in a vertical plane 6 below the inlet is replaced by a set of seven steam injection orifices (only four, 15a-d are visible) which are distributed in a plane 16 which forms an acute angle with the longitudinal direction of the reactor vessel, i.e. is inclined forwardly, i.e. in the direction from the inlet to the outlet. In this manner, the steam injection orifices are distributed in both the longitudinal and lateral/circumferential directions of the reactor vessel. The angle of the plane is preferably such that it corresponds to the gradient of the filling degree in the reactor under normal operation conditions. An example of a typical filling degree as a function of reactor length is illustrated in FIG. 3b directly below FIG. 3a. The uppermost orifices (15a and the corresponding orifice on the rear side) are preferably arranged at a vertical height of the reactor which corresponds to, or is slightly above or below, the material level under normal operating conditions, as illustrated in FIG. 3b.

Figure 4:
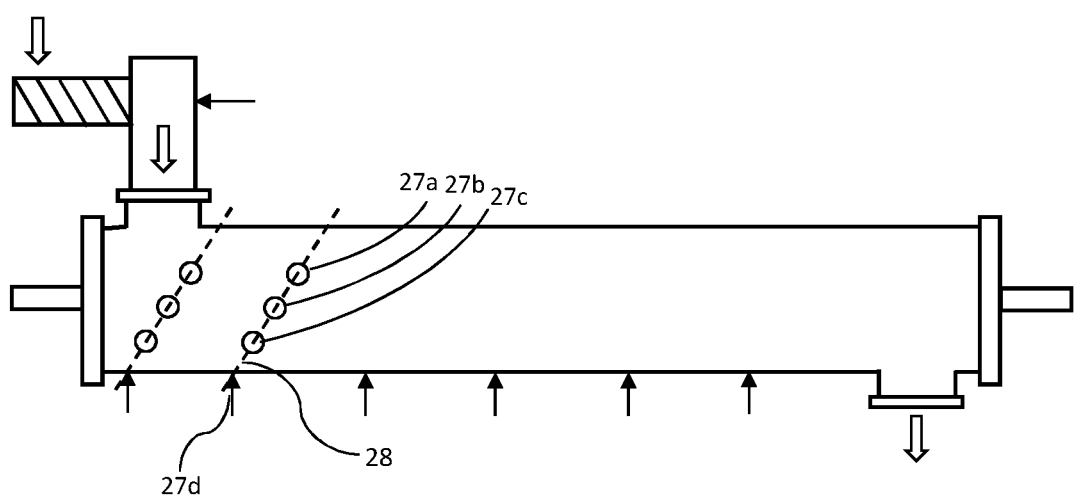
FIG. 4 is a schematic illustration of yet another embodiment of a reactor arrangement according to the first aspect of the invention.

FIG. 4 is a schematic side view illustration of another embodiment of a reactor arrangement according to the first aspect of the invention. The reactor arrangement differs from the embodiment in FIG. 3a in that it comprises an additional set of steam injection orifices 27a-d arranged downstream of the (first) set of orifices. In this embodiment the additional set of orifices has an identical configuration as the (first) set of orifices, i.e. comprises seven steam injection orifices (only four, 27a-d are visible) arranged in an plane 28 inclined at the same angle as plane 16. The additional set of steam injection orifices is arranged about 1 m downstream of the inlet. In other embodiments, the additional set of steam injection orifices may comprise a different number of orifices, and the plane 28 may be inclined at a different angle, or may even by vertical.

Figure 5:
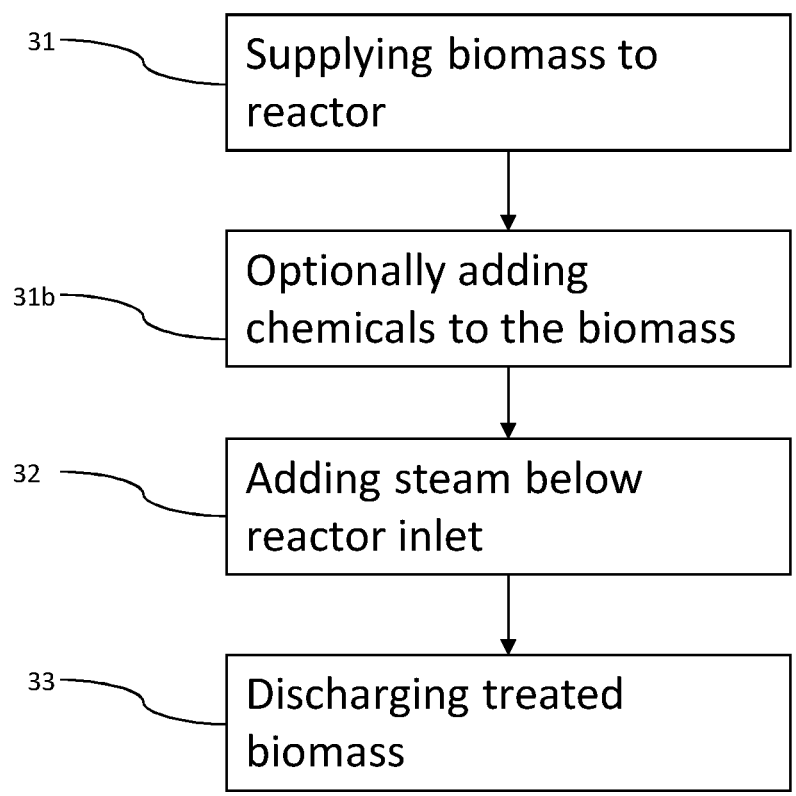
FIG. 5 is a block diagram illustrating an embodiment of a method according to the second aspect of the invention.

FIG. 5 is a block diagram illustrating an embodiment of a method according to the second aspect of the invention. The method concerns pre-hydrolysis of biomass in an elongated substantially horizontal reactor vessel, wherein the vessel comprises an inlet for receiving said biomass material arranged at a first longitudinal end of the vessel at an upper portion thereof, and an outlet at a second longitudinal end of the vessel. The method comprises supplying 31 biomass to the vessel via the inlet, adding or injecting steam 32 into the reactor vessel below the inlet at two or more positions being at a distance from each other, and discharging 33 the treated biomass via said outlet. The two or more positions are spaced apart in the lateral direction of the reactor vessel. The method further comprises the optional step 31b of adding chemicals such as acid or catalyzing agents to the biomass, which step may be performed before the biomass is supplied to the reactor, or directly into the reactor.

In the embodiments shown in FIGS. 2, 3a, 4, the sets steam injection orifices are complemented by steam injection orifices in the charger and along the bottom of the reactor vessel corresponding to orifices 5a'-5e' in FIG. 1. In other embodiments, one or more, or even all of these orifices may be omitted.

The description above and the appended drawings are to be considered as non-limiting examples of the invention. The person skilled in the art realizes that several changes and modifications may be made within the scope of the invention. For example, the number of steam injection orifices may be varied, and the positions thereof may be varied. Furthermore, the reactor vessel does not have to be horizontal, but may for example incline downwards or upwards towards the outlet. Furthermore, the inlet of the reactor vessel does not have to be connected to a charger of the type illustrated in the figures. Furthermore, the reactor vessel does not necessarily have a cylindrical shape. Furthermore, not all of the steam injection orifices of the set of orifices need to be arranged directly below the inlet, i.e. the set of orifices may comprise one or more orifices arranged at longitudinal positions of the reactor vessel which lie outside the longitudinal interval defined by the longitudinal extension of the inlet. The scope of protection is determined by the appended patent claims.

The invention claimed is:

1. A reactor arrangement for pre-hydrolysis of biomass material,
   comprising a reactor vessel arranged substantially horizontally,
   wherein said vessel comprises an inlet for receiving said biomass material, said inlet being arranged at a first longitudinal end of the vessel at an upper portion thereof,
   wherein said vessel comprises an outlet at a second longitudinal end of the vessel,
   wherein said arrangement further comprises a set of steam injection orifices provided in through holes in the reactor vessel wall and arranged to inject steam into said vessel, said set of steam injection orifices comprising at least two orifices arranged below said inlet at a distance from each other in the circumferential direction of the reactor vessel.

2. Reactor arrangement according to claim 1, wherein at least two of said steam injection orifices are arranged below said inlet and at a distance from each other in the longitudinal direction of the vessel.

3. Reactor arrangement according to claim 1, wherein said set of steam injection orifices comprises at least three orifices distributed in a plane crossing said reactor vessel along part of the circumference of the vessel.

4. Reactor arrangement according to claim 3, wherein said plane is perpendicular to the longitudinal direction of the vessel.

5. Reactor arrangement according to claim 3 wherein said plane forms an acute angle with the longitudinal direction of the vessel.

6. Reactor arrangement according to claim 1, wherein at least two of said steam injection orifices have different diameters.

7. Reactor arrangement according to claim 6, wherein at least one steam injection orifice arranged at a vertical position lower than at least one other steam injection orifice has a greater diameter than said other orifice.

8. Reactor arrangement according to claim 1, wherein the vessel has a diameter of at least 1 m or at least 2 m.

9. Reactor arrangement according to claim 1, further comprising at least one additional set of steam injection orifices arranged downstream of said set of orifices, said additional set of orifices comprising at least two steam injection orifices.

10. Reactor arrangement according to claim 9, wherein the at least one additional set of steam injection orifices is arranged less than 2 m downstream of said inlet, and preferably less than 1 m downstream of said inlet.

11. Reactor arrangement according to claim 1, further comprising a charging device comprising a substantially vertically arranged pipe connected to said inlet, and a plug screw feeder connected to an upper portion of said pipe for feeding pressurized biomass material thereto.

12. Reactor arrangement according to claim 1, further comprising a conveyor screw arranged inside vessel, said screw extending substantially along the length of the vessel.

13. Reactor arrangement according to claim 1, further comprising a discharge device connected to said outlet.

14. Reactor arrangement according to claim 1, wherein said reactor vessel is substantially cylindrical.

15. Method for pre-hydrolysis treatment of biomass material in an elongated substantially horizontal reactor vessel, wherein said reactor vessel comprises an inlet for receiving said biomass material arranged at an upper portion of said vessel, and an outlet, said method comprising supplying biomass to said vessel via said inlet;

adding steam into the reactor vessel below said inlet at two or more positions provided in through holes in the reactor vessel wall and being at a distance from each other in the circumferential direction of the reactor vessel; and discharging the treated biomass from said outlet.

* * * * *

UNITED STATES PATENT AND TRADEMARK OFFICE
CERTIFICATE OF CORRECTION

PATENT NO. : 11,420,180 B2  
APPLICATION NO. : 16/759503  
DATED : August 23, 2022  
INVENTOR(S) : Lambert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this  
Thirtieth Day of July, 2024

Katherine Kelly Vidal  
*Director of the United States Patent and Trademark Office*